Patented Feb. 10, 1953

2,628,234

UNITED STATES PATENT OFFICE 2,628,234

MONO-N-TERTIARY-ALKYLMELAMINES

Newman M. Bortnick, Philadelphia, Pa., assignor to Rohm & Haas Company, Philadelphia, Pa., a corporation of Delaware No Drawing. Application May 13, 1950, Serial No. 161,900

7 Claims. (Cl. 260—249.6)

This invention relates to a new class of mono-N-alkylmelamines; namely, mono-N-tertiary-alkylmelamines, and to their preparation.

By the process of this invention a tertiary-alkylcyanamide is reacted with dicyandiamide under the conditions described hereinafter to form a mono-N-substituted melamine of which one amino group carries the same tertiary-alkyl group as was present in the tertiary-alkylcyanamide. The reaction which takes place is represented by the following equation:

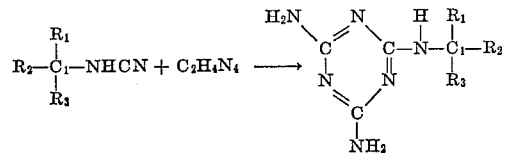

in which

is a tertiary-alkyl group in which, in turn, $R_1$, $R_2$, and $R_3$ are alkyl groups such as the following groups: Methyl, ethyl, n-propyl, iso-propyl, n-butyl, sec.-butyl, tert.-butyl, tert.-amyl, 2-ethylhexyl, lauryl, and hexadecyl groups, and all isomers of these groups. This invention also includes the substituted melamines of the above general formula wherein $R_1$ and $R_2$ taken together with the tertiary carbon atom, $C_1$, represent an aliphatic, cyclic radical to one and the same carbon atom of which are attached both the secondary amino group, =NH, of the melamine and the alkyl group, $R_3$. That is to say, $R_1$ and $R_2$, in addition to representing individual alkyl groups, when taken together also represent an alkylene group, preferably a polymethylene group, the terminal carbon atoms of which alkylene group are both attached to the tertiary carbon atom, $C_1$, which also carries the alkyl group, $R_3$, and is attached to the secondary amino group, =NH, of the melamine. Examples of such alicyclic-substituted melamines are the following:

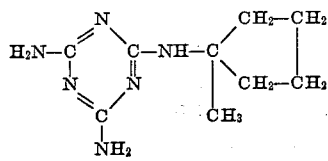

and

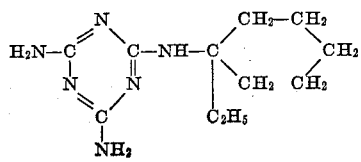

which are made respectively from dicyandiamide and the following tertiary-alkylcyanamides:

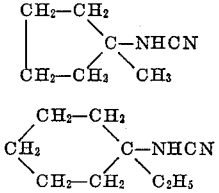

and

The smallest aliphatic radical represented by the characters $R_1$, $R_2$, and $R_3$ above is, of course, the methyl group and the largest is the hexadecyl group since this invention is limited to those monosubstituted melamines which can be made commercially and in which the total number of carbon atoms in the three R-groups is from three, as in the case of 2-tert.-butylamino-4,6-diamino-1,3,5-triazine, to eighteen, as in the case, for example, of 2-tert.-nonadecylamino-4,6-diamino-1,3,5-triazine:

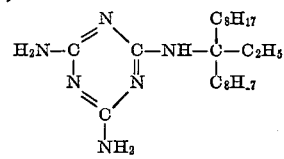

It is to be noted that the groups which are represented by $R_1$, $R_2$, and $R_3$ are not affected by the reaction of the tertiary-alkylcyanamide and dicyandiamide, so that, as a result, the substituted melamines which are produced have the same substituents, $R_1$, $R_2$, and $R_3$, as the alkylcyanamides from which they are made.

The tertiary-alkylcyanamides from which the new substituted melamines of this invention are prepared are themselves new compounds and they are the subject of another application, Serial No. 161,899, filed May 13, 1950, by this inventor. They are unique compounds in that they are much more stable than other alkylcyanamides and they react readily with dicyandiamide to form the substituted melamines of this invention whereas known monosubstituted cyanamides such as monocyclohexylcyanamide and monomethylcyanamide do not react in a similar manner.

In preparing the mono-N-tertiary-alkylmelamines of this invention, a tertiary-alkylcyanamide is reacted with dicyandiamide at temperatures above 50° C. in the presence of a strongly basic condensing agent. The substituted melamines are obtained in excellent yields in a high state of purity.

While the reaction of dicyandiamide and the tertiary-alkylcyanamide can be carried out at temperatures from 50° C. to 250° C., it is much preferred and recommended that temperatures 80° C. to about 150° C. be employed.

Best results are obtained when the reaction takes place in solution, preferably at refluxing temperature. Preferably an organic liquid is used which is a solvent for the tertiary-alkylcyanamide and in which substantial amounts of dicyandiamide dissolve but which is not a solvent for the substituted melamine which is produced. When such a liquid is employed, the product precipitates from the reaction mixture as it is formed. Many organic liquids are suitable and the following list is merely illustrative of those which are most readily available and satisfactory: Alcohols, particularly the lower alkanols containing up to 10 carbon atoms such as methanol, the butanols, octanols, and decanols; esters containing up to a total of 12 carbon atoms such as butyl acetate; ketones containing up to 12 carbon atoms such as methyl hexyl ketone; nitrobenzenes; nitroparaffins such as nitroethane; dioxane; alkyl ethers of polyglycols such as the butyl ether of diethylene glycol. Hydrocarbons, particularly aromatic hydrocarbons typified by toluene, may be used as diluents for the above solvents. In fact, the reaction takes place in the absence of solvents but always with the production of a contaminated and hard product which requires purification. The reaction, of course, can be carried out under super-atmospheric pressure.

A strongly alkaline condensing agent is necessary; and for this purpose the oxides, hydroxides, carbonates, hydrides, and alcoholates of the alkali metals, particularly those of lithium, sodium, and potassium, are suitable. The alkali metals per se can be used, as well as quaternary ammonium hydroxides and alkoxides such as benzyltrimethylammonium hydroxide and benzyltrimethylammonium butoxide. The term "strongly alkaline agent" as used herein in its accepted sense; that is, as describing a compound which yields a high concentration of hydroxyl ions in aqueous solution, such as one whose 0.1 N aqueous solution has a pH of 11 to 13 at 25° C.

The alkaline condensing agent is used to the extent of 0.1 to 50 mole per cent based on the number of moles of dicyandiamide and tertiary-alkylcyanamide. Higher amounts can be used but there appears to be no advantage in doing so. In fact, a much preferred ratio is 1 to 20 mole per cent.

The process of this invention is illustrated by the following examples.

Example 1

A mixture of 38.5 parts (0.25 mole) of dimethylneopentylcarbinylcyanamide, 21 parts (0.25 mole) of dicyandiamide, 40 parts of butanol, and 1.4 parts of powdered potassium hydroxide was stirred and refluxed for two hours at which time a second portion of 1.4 parts of powdered potassium hydroxide was added and the refluxing was continued for two more hours. The mixture was cooled and diluted with 50 parts of methanol and allowed to stand overnight. The precipitate which formed was filtered off, washed with 250 parts of boiling water, and dried. The dried product (25 parts) was then crystallized from ethylene dichloride. It had a melting point of 160–162° C. and its analysis corresponded to that of a substituted melamine having the formula:

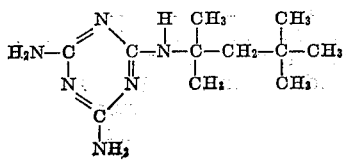

Example 2

This procedure was a modification of that described in Example 1.

A mixture of 38.5 parts of dimethylneopentylcarbinylcyanamide, 25 parts of dicyandiamide, 80 parts of n-propanol, and 1.4 parts of powdered potassium hydroxide was stirred and refluxed for two hours, at which time 1.4 parts of potassium hydroxide was added and the reaction mixture was again refluxed for two more hours after which a third portion (1.4 parts) of powdered potassium hydroxide was added and the reaction continued for a final period of two hours. On cooling, a precipitate settled out of the reaction mixture and this material was filtered off, washed with hot water, and recrystallized from ethylene dichloride. A 68% yield of very pure product was obtained which had a melting point of 160–161° C. and which contained, on analysis, 35.4% nitrogen against a calculated value of 35.3% nitrogen content in the substituted melamine having the formula set forth in Example 1.

Example 3

The procedure of Example 1 was followed with one exception; namely, that mono-tert.-butylcyanamide (24.5 parts) was used in place of the dimethylneopentylcarbinylcyanamide. A crystalline solid melting at 156–158° C. was obtained in an 82% yield based on the cyanamide. The following composition was confirmed by analysis:

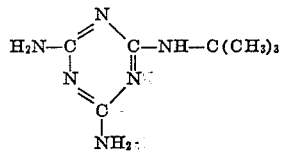

Example 4

1-methylcyclohexylcyanamide-1, having the formula

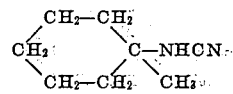

was reacted with dicyandiamide in the ratio of one mole of this cyanamide to 1.2 moles of dicyandiamide in the presence of 10 mole per cent of solid sodium hydroxide and dissolved in butanol. Thus, 138 parts of 1-methylcyclohexylcyanamide-1, 100.8 parts of dicyandiamide, and 8 parts of sodium hydroxide were mixed in 300 parts of butanol at room temperature. This mixture was heated in 30 minutes to refluxing temperature and was thereafter refluxed for six hours. The mixture was then stripped of butanol under a reduced pressure of 10 mm. and the residue was recrystallized from ethylene dichloride. The product, obtained in an amount equal to a 72% yield based on the tertiary cyanamide, gave an analysis which corresponded very closely to that of the compound

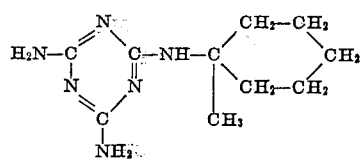

Example 5

The process of Example 2 was followed with one exception; namely, that 53.5 parts (0.25 mole) of mono-tert.-tridecylcyanamide (isooctyldiethylcarbinylcyanamide) was reacted with the dicyandiamide instead of the dimethylneopentylcarbinylcyanamide of that example. After the period of heating the propanol was distilled off and the residue was dissolved in 200 parts of isooctane. This solution was shaken and extracted with four successive portions (50 parts each) of Claisen's alkali. The isooctane solution was then evaporated to dryness to give a glass-like product the analysis of which conformed to that of the compound:

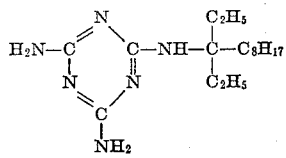

*Example 6*

When the procedure of Example 1 was followed in an effort to react dicyandiamide with mono-n-butylcyanamide in equimolar amounts, no mono-n-butylmelamine was obtained. Likewise, both mono-methylcyanamide and mono-cyclohexylcyanamide failed to react with dicyandiamide to produce respectively mono-methylmelamine and mono-cyclohexylmelamine by the procedure of Example 2.

On the other hand, the procedure of Example 2 can be employed consistently for the production of mono-N-tertiary-alkylmelamines in yields above 60% by reacting dicyandiamide with the tertiary-alkylcyanamides described above. The resultant substituted melamines carrying the tertiary aliphatic group are eminently suited for the production of thermosetting resins for use in textile-finishes, surface-coatings and adhesives by reaction with aldehydes, particularly with formaldehyde. Such resins are characterized by having greater flexibility than those made from unmodified melamine, by being definitely more soluble in organic solvents, and by having greater compatibility with alkyd resins.

I claim:

1. A compound of the formula

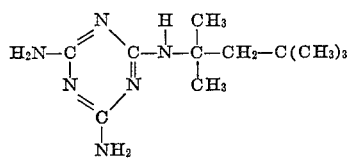

2. A process for the production of mono-substituted melamines having the general formula

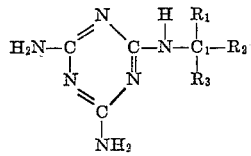

in which

represents a tertiary alkyl radical wherein $R_1$, $R_2$, and $R_3$ are alkyl groups and in addition $R_1$ and $R_2$ taken together with the tertiary atom, $C_1$, represent a cyclic aliphatic radical which carries the alkyl substituent, $R_3$, on the same carbon atom which is joined to the secondary amino group, =NH, the total number of carbon atoms in the groups represented by $R_1$, $R_2$, and $R_3$ totalling three to eighteen, which process comprises reacting at a temperature of 50° to 250° C., in the presence of a strongly alkaline agent, one mole of dicyandiamide and one mole of a tertiary-alkyl-cyanamide having the general formula

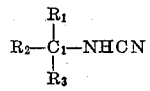

in which $R_1$, $R_2$, and $R_3$ are identical with the same characters described above.

3. A process for the production of mono-substituted melamines having the general formula

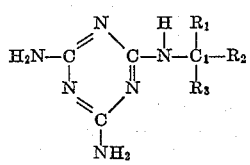

in which

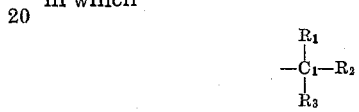

represents a tertiary-alkyl radical wherein $R_1$, $R_2$, and $R_3$ are alkyl groups and in addition $R_1$ and $R_2$ taken together with the tertiary atom, $C_1$, represent a cyclic aliphatic radical which carries the alkyl substituent, $R_3$, on the same carbon atom which is joined to the secondary amino group, =NH, the total number of carbon atoms in the groups represented by $R_1$, $R_2$, and $R_3$ totalling three to eighteen, which process comprises reacting at a temperature of 80° to 150° C., in the presence of a strongly alkaline agent, one mole of dicyandiamide and one mole of a tertiary-alkyl-cyanamide having the general formula

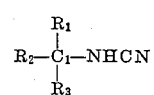

in which $R_1$, $R_2$, and $R_3$ are identical with the same characters described above, the reaction being carried out in an organic liquid which is a solvent for said tertiary-alkylcyanamide and is a non-solvent for said substituted melamine, and thereafter separating said substituted melamine.

4. A process for the production of the substituted melamine having the general formula

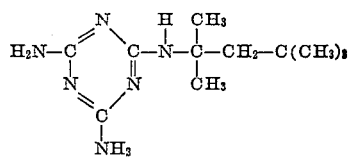

which comprises reacting at a temperature of 80° to 150° C., in the presence of a strongly alkaline agent, one mole of dicyandiamide and one mole of the tertiary-alkylcyanamide having the formula $(CH_3)_3C-CH_2-C(CH_3)_2-NHCN$.

5. A process for the production of the substituted melamine having the general formula

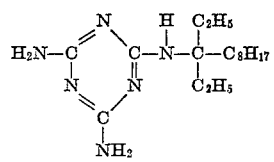

which comprises reacting at a temperature of 80° to 150° C., in the presence of a strongly alkaline agent, one mole of dicyandiamide and one mole of the tertiary-alkylcyanamide having the formula

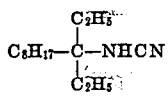

6. A process for the production of the substituted melamine having the general formula

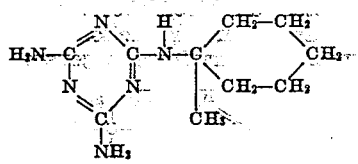

which comprises reacting at a temperature of 80° to 150° C., in the presence of a strongly alkaline agent, one mole of dicyandiamide and one mole of the tertiary-alkylcyanamide having the formula

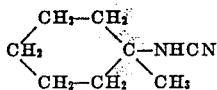

7. A process for the production of the substituted melamine having the general formula

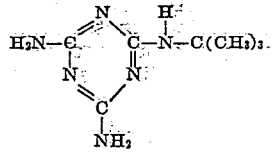

which comprises reacting at a temperature of 80° to 150° C., in the presence of a strongly alkaline agent, one mole of dicyandiamide and one mole of the tertiary-alkylcyanamide having the formula $(CH_3)_3C—NHCN$.

NEWMAN M. BORTNICK.

REFERENCES CITED

The following references are of record in the file of this patent:

UNITED STATES PATENTS

| Number | Name | Date |
|---|---|---|
| 2,331,670 | Ericks | Oct. 12, 1943 |
| 2,361,823 | D'Alelio | Oct. 31, 1944 |

FOREIGN PATENTS

| Number | Country | Date |
|---|---|---|
| 238,261 | Switzerland | October 1945 |
| 238,263 | Switzerland | October 1945 |